United States Patent [19]
Yaguchi et al.

[11] Patent Number: 5,982,955
[45] Date of Patent: *Nov. 9, 1999

[54] OPTICAL IMAGE INDEXED DOCUMENT FILER

[75] Inventors: Hiroyuki Yaguchi, Kawasaki; Hideto Kohtani, Yokohama; Ken Kuroda, Yokohama; Takehito Utsunomiya, Yokohama, all of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/489,115

[22] Filed: Jun. 9, 1995

Related U.S. Application Data

[63] Continuation of application No. 08/148,338, Nov. 8, 1993, abandoned.

[30] Foreign Application Priority Data

Nov. 16, 1992 [JP] Japan ..................................... 4-305425

[51] Int. Cl.⁶ ..................................................... G06K 9/00
[52] U.S. Cl. ........................................... 382/305; 382/317
[58] Field of Search ..................................... 382/305, 306, 382/317, 232; 235/456; 345/115, 201, 203; 358/403

[56] References Cited

U.S. PATENT DOCUMENTS

| | | | |
|---|---|---|---|
| 3,872,462 | 3/1975 | Lemelson | 345/115 |
| 4,408,181 | 10/1983 | Nakayama | 382/61 |
| 4,736,109 | 4/1988 | Dvorzsak | 235/456 |
| 4,748,678 | 5/1988 | Takeda et al. | 382/61 |
| 4,797,946 | 1/1989 | Katsuta et al. | 382/306 |
| 4,808,987 | 2/1989 | Takeda et al. | 345/115 |
| 4,937,439 | 6/1990 | Wanninger et al. | 235/456 |
| 5,038,393 | 8/1991 | Nanba | 382/61 |
| 5,099,340 | 3/1992 | Kamada et al. | 358/403 |
| 5,129,016 | 7/1992 | Murakami et al. | 382/61 |
| 5,251,297 | 10/1993 | Takayanagi | 358/403 |
| 5,255,104 | 10/1993 | Kajigaya | 358/403 |
| 5,274,468 | 12/1993 | Ojha | 382/309 |
| 5,313,572 | 5/1994 | Yamamoto et al. | 382/306 |
| 5,563,966 | 10/1996 | Ise et al. | 382/317 |
| 5,572,726 | 11/1996 | Hasuo | 395/616 |
| 5,579,419 | 11/1996 | Yaguchi et al. | 382/305 |
| 5,881,214 | 3/1999 | Morisawa et al. | 395/117 |

*Primary Examiner*—Andrew W. Johns
*Attorney, Agent, or Firm*—Fitzpatrick, Cella, Harper & Scinto

[57] ABSTRACT

An image filing apparatus includes a reading unit for reading an image of a mark sheet. The mark sheet has a plurality of index areas on each of which an index image representing index information for retrieving an image stored in a storage medium is to be printed, a plurality of check areas on each of which a check for assigning the corresponding one of the plurality of index areas is to be entered, and a drawing area for drawing an index image to be newly registered, and for outputting an image signal. The apparatus also includes a detector for detecting which check area has been checked based on the image signal from the reading unit, a registration unit for registering, in the index area corresponding to the check area detected by the detector the index image drawn in the drawing area, and a provision unit for providing the index image drawn in the drawing area as index information of an original to be read by the reading unit after the mark sheet.

9 Claims, 9 Drawing Sheets

OPTICAL IMAGE INDEXED DOCUMENT FILER

This application is a continuation of application Ser. No. 08/148,338 filed Nov. 8, 1993 abandoned.

BACKGROUND OF THE INVENTION

1. Field of the Invention

This invention relates to an image filing apparatus which stores a document image in a storage medium together with index information.

2. Description of the Related Art

Recently, the number of offices using image filing apparatuses for high-volume preserving and controlling of documents has been increasing. Such image filing apparatuses typically include an index indicating the contents of each document information whereby document control is performed based on the index.

Apparatuses which use image data as an index instead of character data are proposed, for example, in commonly-assigned U.S. patent application Ser. Nos. 477,470, filed Feb. 9, 1990, 478, 250, filed Feb. 9, 1990, now U.S. Pat. No. 5,363,504, issued Nov. 8, 1994 and 601, 445, filed Oct. 23, 1990. When using an index image as described in these applications, the index image must be registered in advance. Furthermore, in these applications, an index image is assigned using a keyboard of a filing apparatus.

In order to facilitate the retrieval and storage of such document information, an image filing apparatus which uses a mark sheet having information relating to the retrieval and storage has been proposed in U.S. patent application Ser. Nos. 061, 739, filed May 17, 1993, and 061,743, filed May 17, 1993.

However, when registering a new index image and storing a document using that index image, several independent steps must be performed by the user, namely: setting a mode of forming the index image using a keyboard or the like, registering the index image, setting a mode of storing the document image, and reading the document image. Such operations are troublesome for the user.

SUMMARY OF THE INVENTION

It is an object of the present invention to provide an image filing apparatus in which the above-described disadvantages are overcome.

It is another object of the present invention to provide an image filing apparatus which can store a document image read after a mark sheet and provide the document image with a new index image.

It is still another object of the present invention to provide an image filing apparatus in which the registration of an index image and the assignment of an index image to be provided can be simultaneously performed.

According to one aspect, the present invention which achieves these objectives relates to an image filing apparatus comprising reading means for reading the image of a mark sheet having a plurality of index areas on each of which an index image representing index information for retrieving an image stored in a storage medium is to be printed, a plurality of check areas on each of which a check for assigning the corresponding one of the plurality of index areas is to be entered, and a drawing area for drawing an index image to be newly registered, and for outputting an image signal, detection means for detecting which check area has been checked based on the image signal from the reading means, registration means for registering the index image drawn in the drawing area in the index area corresponding to the check area detected by the detection means, and provision means for providing the index image drawn in the drawing area as index information of an original to be read by the reading means after the mark sheet.

According to another aspect, the present invention which achieves these objectives relates to an image filing apparatus comprising reading means for reading the image of an original and for outputting an image signal, judging means for judging whether or not the original read by the reading means is a mark sheet based on the image signal from the reading means. The mark sheet has a plurality of index areas on each of which an index image representing index information of an image to be stored in a storage medium is to be printed, and a plurality of check areas on each of which a check for assigning a desired index area is to be entered. The apparatus further comprises detection means for detecting which check area is checked based on the image signal from the reading means when the judging means has judged that the read original is a mark sheet, registration means for registering a new index image in the index area corresponding to the check area detected by the detection means, and provision means for providing, when the original read after the mark sheet is not a mark sheet, the new index information registered by the registration means as index information of the original.

According to still another aspect, the present invention which achieves these objectives relates to an image filing apparatus comprising readout means for reading out an index image from a storage medium storing each index image representing index information for retrieving a desired image, output means for outputting a mark sheet on which a plurality of index images read by the reading means are printed in a predetermined arrangement, and a plurality of check areas for entering checks for assigning each of the plurality of index images and a position on which the index image is not printed are printed, reading means for reading images on the mark sheet, detection means for detecting which check area is assigned based on an image signal from the reading means, and registration means for storing, when the check area detected by the detection means is present at a position where no index image is printed, a new index image in the storage medium so that it corresponds to the position.

These and other objects, advantages and features of the present invention will become more apparent from the following detailed description of the preferred embodiments taken in conjunction with the accompanying drawings.

DETAILED DESCRIPTION OF THE PREFERRED EMBODIMENT

Figure 1:
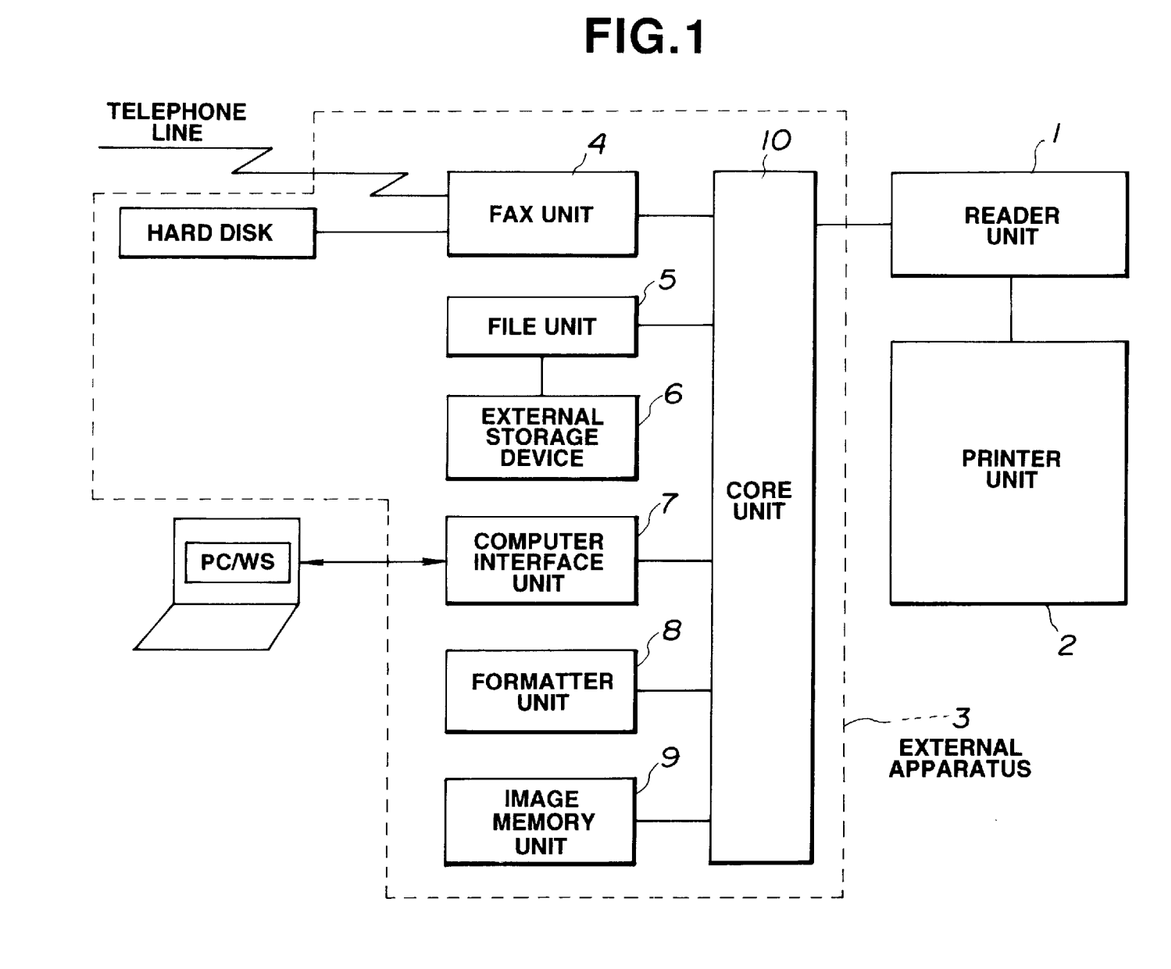
FIG. 1 is a diagram illustrating the entire configuration of an image forming apparatus.

FIG. 1 is a block diagram illustrating the configuration of an image forming system according to an embodiment of the present invention.

In FIG. 1, an image input device (hereinafter termed a reader unit) 1 reads an original and outputs multivalue image data. An image output device (hereinafter termed a printer unit) 2 includes a plurality of kinds of recordingpaper cassettes, and outputs image data on recording paper as a visual image in response to a print command. External apparatus 3, electrically connected to reader unit 1, has various functions and includes a fax unit 4, a file unit 5, an external storage device 6 connected to the file unit 5, a computer interface unit 7 connected to a computer, a formatter unit 8 for converting information from the computer into a format for obtaining a visual image in the printer unit 2, an image memory unit 9 for storing information from the reader unit 1 and for temporarily storing information transmitted from the computer, a core unit 10 for controlling the functions of these units, and the like. The function of each of the units 1–9 will now be described.

Explanation of Reader Unit 1

Figure 2:
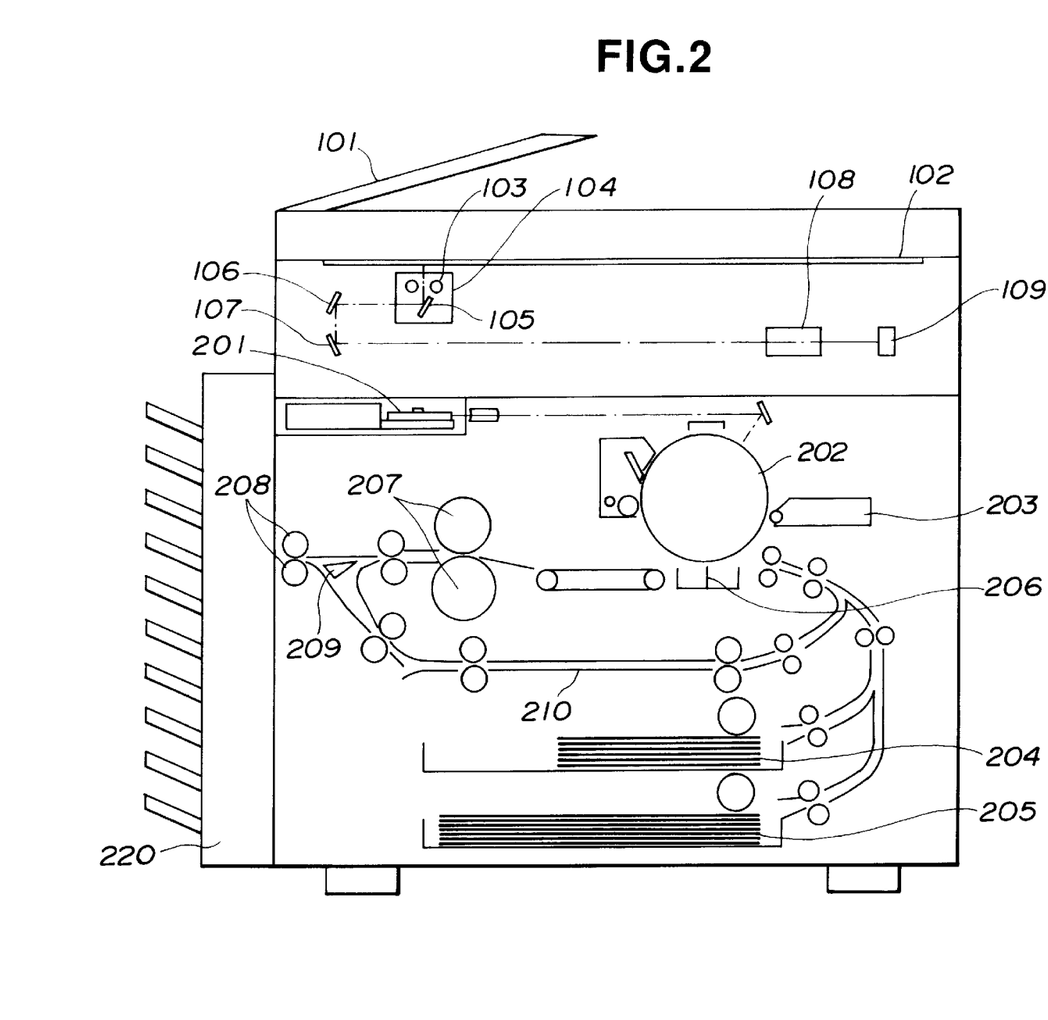
FIG. 2 is a cross-sectional view of reader unit 1 and printer unit 2.

FIG. 2 is a cross-sectional view showing the configuration of reader unit 1 and printer unit 2. First, the configuration and operation of reader unit 1 will be described.

Originals mounted on original-feeding unit 101 are sequentially conveyed onto original-mount glass surface 102 by depressing a copy-start key on an operation unit. When an original has been conveyed, lamp 103 of scanner unit 104 is turned on, and scanner unit 104 performs exposure scanning of the original while moving. Light reflected from the original is imaged onto a CCD (charge-coupled device) image sensor unit 109 (hereinafter termed a CCD) via mirrors 105, 106 and 107, and lens 108.

Figure 3:
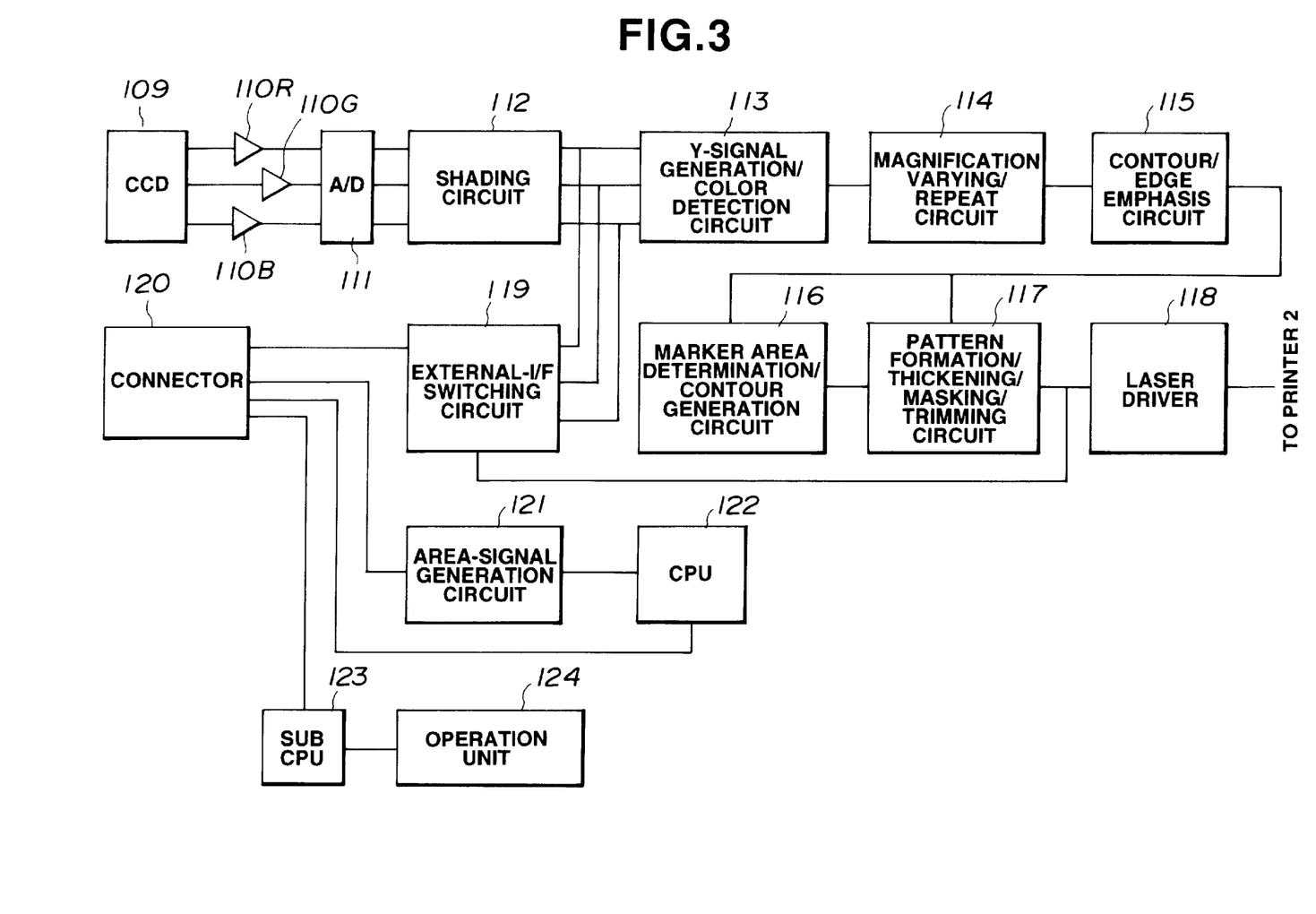
FIG. 3 is a block diagram of an image processing unit within the reader unit 2.

FIG. 3 is a block diagram of circuitry illustrating the configuration of the signal processing of reader unit 1. The configuration and the operation of the circuitry will now be described.

Image information input to CCD 109 is subjected to photoelectric conversion and is thereby converted into an electrical signal. Color image information from CCD 109 is amplified by amplifiers 110R, 110G and 110B in the following stage in accordance with the level of an input signal from A/D converter 111. Respective output signals from A/D converter 111 are input to shading circuit 112, where unevenness in the luminous intensity distribution of lamp 103, and unevenness in the sensitivity of CCD 109 are corrected. Signals from shading circuit 112 are input to Y-signal generation/color detection circuit 113 and external-I/F/switching circuit 119.

Y-signal generation/color detection circuit 113 calculates the signals from shading circuit 112 using the following expression to obtain a Y signal:

$$Y = 0.3R + 0.6R + 0.1B.$$

The circuit 113 also includes a color detection circuit for separating seven colors from respective R, G and B image signals and for outputting signals representing respective colors. The output signal of Y-signal generation/color detection circuit 113 is input to magnification-varying/repeat circuit 114. Magnification-varying processing in the sub-scanning direction is performed by varying the scanning speed of scanner unit 104, and magnification-varying processing in the main-scanning direction is performed by magnification-varying/repeat circuit 114. Magnification-varying/repeat circuit 114 can output a plurality of identical image signals. Contour/edge emphasis circuit 115 obtains edge-emphasis and contour information by emphasizing a high-frequency component of the signal from magnification-varying/repeat circuit 114. The signal from contour/edge emphasis circuit 115 is input to marker area determination/contour generation circuit 116 and pattern formation/thickening/masking/trimming circuit 117.

Marker area determination/contour generation circuit 116 recognizes a portion on the original written by a marker pen of an assigned color, and generates contour information of that portion. Pattern formation/thickening/masking/trimming circuit 117 performs thickening processing, masking or trimming based on the contour information. The circuit 117 also converts the color image data into pattern data in accordance with the color detection signal from Y-signal generation/color detection circuit 113.

The output signal from pattern formation/thickening/masking/trimming circuit 117 is input to laser driver circuit 118, in which various kinds of processed signals are converted into a signal for driving a laser. The output signal of laser driver circuit 118 is input to printer 2, which forms a visual image.

Next, a description will be provided of external-I/F switching circuit 119 which performs an I/F (interface) operation with the external apparatus.

When outputting image information from reader unit 1 to external apparatus 3, external-I/F switching circuit 119 outputs image information from pattern formation/thickening/masking/trimming circuit 117 to connector 120. When inputting image information from external apparatus 3 to reader unit 1, external-I/F switching circuit 119 inputs image information from connector 120 to Y-signal generation/color detection circuit 113.

The above-described image processing is performed according to instructions from CPU 122, and area-signal generation circuit 121 generates various kinds of timing signals necessary for the above-described image processing in accordance with values set by CPU 122. Communication with external apparatus 3 is performed using a communication function incorporated within CPU 122. Sub-CPU 123 controls operation unit 124, and performs communication with external apparatus 3 using a communication function incorporated within Sub-CPU 123.

Explanation of Printer Unit 2

The configuration and the operation of printer unit 2 will now be described with reference to FIG. 2.

The signal input to printer unit 2 is converted into an optical signal by exposure control unit 201, and photosensitive member 202 is irradiated with a laser beam in accordance with the image signal. A latent image formed on photosensitive member 202 by the irradiating light is developed by developing unit 203. A sheet of transfer paper is conveyed from transfer-paper mounting unit 204 or 205 in synchronization with the development, and the developed image is transferred onto the sheet by transfer unit 206. The transferred image is fixed by fixing unit 207, and the sheet is discharged from the apparatus by sheet-discharging unit 208. The sheet output from sheet-discharging unit 208 is discharged in the corresponding bin of sorter 220 when a sorting function operates in sorter 220, and in the uppermost bin of sorter 220 when the sorting function does not operate.

Explanation of External Apparatus 3

External apparatus 3 is connected to reader 1 by a cable, and core unit 10 within external apparatus 3 controls signals and respective functions. As described above, external apparatus 3 includes the fax unit 4 which performs facsimile transmission and reception, the file unit 5 for converting information relating to each original into an electrical signal and preserving the signal, the formatter unit 8 for developing code information from the computer into image information, the computer interface unit 7 for performing an interfacing operation with the computer, the image memory unit 9 for storing information from reader unit 1 and temporarily storing information transmitted from the computer, and the core unit 10 for controlling the functions of the above-described units.

Figure 4:
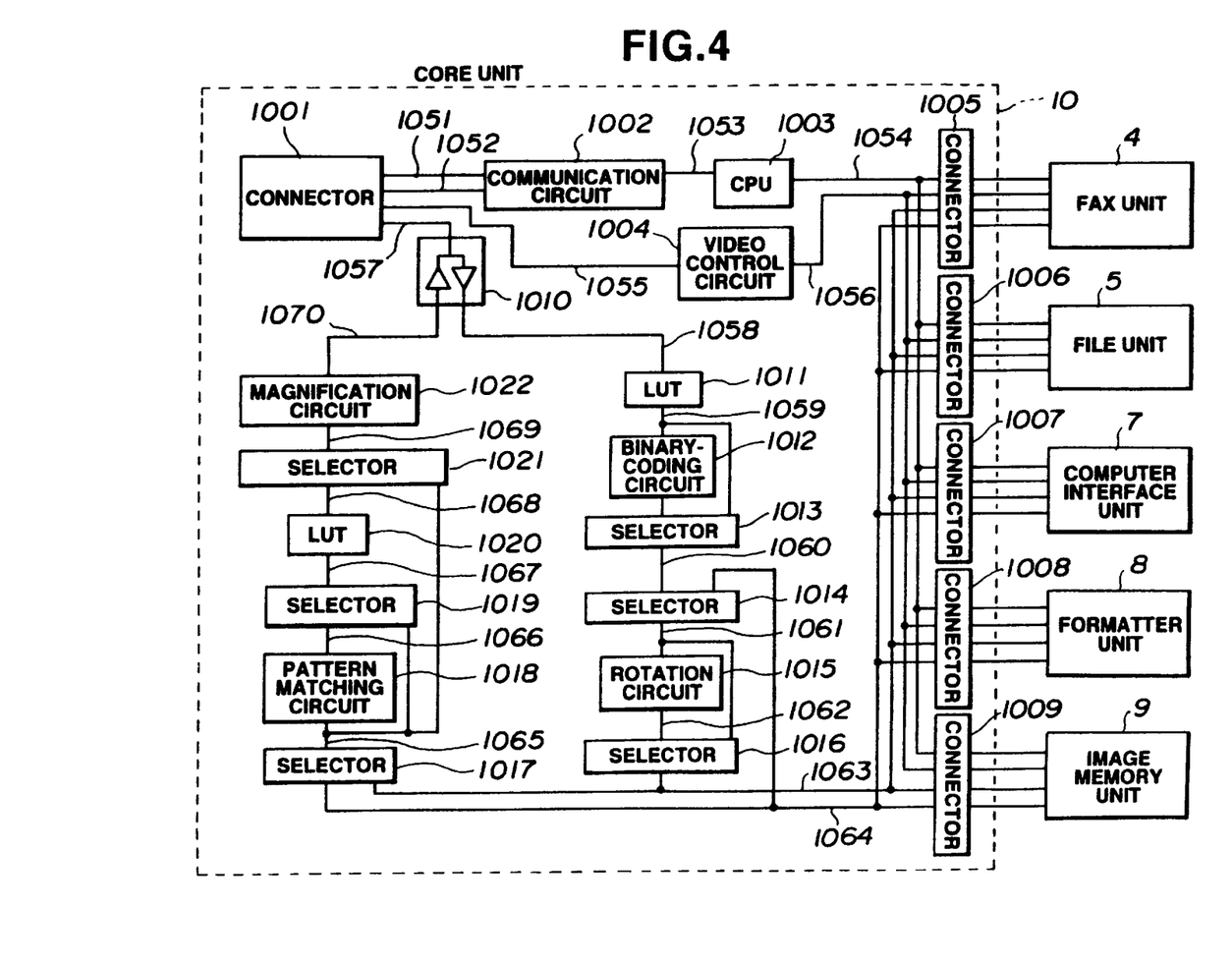
FIG. 4 is a block diagram of core unit 10.

A description will now be provided of the configuration and operation of core unit 10 of external apparatus 3 with reference to the block diagram shown in FIG. 4.

Explanation of Core Unit 10

FIG. 4 is a block diagram showing the detailed configuration of the above-described core unit 10.

Connector 1001 of core unit 10 is connected to connector 120 of reader unit 1 with a cable. Connector 1001 incorporates the following four kinds of signal lines: Signal line 1057, a signal line for transmitting 8-bit multivalue video signals; Signal line 1055, a signal line for transmitting a control signal for controlling a video signal; Signal line 1051, a signal line for perfoming communication with CPU 122 within reader 1; and Signal line 1052, a signal line for performing communication with Sub-CPU 123 within reader 1. Signals transmitted through signal lines 1051 and 1052 are subjected to communication protocol processing by communication circuit 1002, and communication information is transmitted to CPU 1003 via CPU bus 1053.

Signal line 1057 is a two-way video-signal line, and is used for receiving information from reader unit 1 by core unit 10, or outputting information from core unit 1 to reader unit 1.

Signal line 1057 is connected to buffer 1010, and is separated into one-way signal lines 1058 and 1070. Signal line 1058 is a signal line for transmitting an 8-bit multivalue video signal from reader unit 1, which signal is input to LUT 1011 in the following stage. LUT 1011 converts image information from reader unit 1 into a desired value according to a look-up table. Output signal 1059 from LUT 1011 is input to binary-coding circuit 1012 or selector 1013. Binary-coding circuit 1012 has the simple binary-coding function of performing a binary-coding operation of a multivalue signal with a fixed slice level, a binary-coding function using a variable slice level in which the slice level changes in accordance with the values of pixels around a target pixel, and a binary-coding function using an error diffusion method. Binary-coded information is converted into multivalue signals 00H and FFH when the encoded values equal 0 and 1, respectively, and the converted signal is input to selector 1013 in the following stage. Selector 1013 selects either the signal from LUT 1011 or the signal from binary-coding circuit 1012. The output signal from selector 1013 is input to selector 1014 through signal line 1060. Selector 1014 selects either the signal transmitted on signal line 1064, obtained from among output video signals from fax unit 4, file unit 5, computer interface unit 7, formatter unit 8 and image memory unit 9 transmitted through connectors 1005, 1006, 1007, 1008 and 1009, respectively, or the output signal from selector 1013, according to an instruction of CPU 1003. The output signal of selector 1014 is input to rotation circuit 1015 or selector 1016. Rotation circuit 1015 has the function of rotating an input image signal by +90°, −90° and +180°. Information output from reader unit 1 is converted into a binary signal by binary-coding circuit 1012, and the resultant signal is stored in rotation circuit 1015 as information from reader unit 1. Thereafter, in response to an instruction from CPU 1013, rotation circuit 1015 reads the stored information while rotating it. Selector 1016 selects either the output signal of rotation circuit 1015 or the input signal of rotation circuit 1015, and outputs the selected signal to connector 1005 of fax unit 4, connector 1006 of file unit 5, connector 1007 of computer interface unit 7, connector 1008 of formatter unit 8, connector 1009 of image memory unit 9, and selector 1017 via signal line 1063.

Signal line 1063 is a synchronous 8-bit one-way video bus for transmitting image information from core unit 10 to fax unit 4, file unit 5, computer interface unit 7, formatter unit 8 and image memory unit 9. Signal line 1064 is a synchronous 8-bit one-way video bus for transmitting image information from fax unit 4, file unit 5, computer interface unit 7, formatter unit 8 and image memory unit 9. Video control circuit 1004 controls the above-described synchronous buses, i.e., signal lines 1063 and 1064. Control is performed in response to an output signal from video control circuit 1004. Signal line 1054 is connected to connectors 1005–1009. Signal line 1054 is a two-way 16-bit CPU bus, over which asynchronous data commands are exchanged. The transmission of information between fax unit 4, file unit 5, computer interface unit 7, formatter unit 8 and image memory unit 9, and core unit 10 can be performed by the two video buses 1063 and 1064, and the CPU bus 1054.

Signals from fax unit 4, file unit 5, computer interface unit 7, formatter unit 8 and image memory unit 9 are input to selector 1014 and selector 1017. Selector 1014 inputs the signal on signal line 1064 to rotation circuit 1015 in the following stage according to an instruction of CPU 1003.

Selector 1017 selects either the signal on signal line 1063 or the signal on signal line 1064 according to an instruction of CPU 1013. The output signal of selector 1017 is input to pattern matching circuit 1018 and selector 1019. Pattern matching circuit 1018 performs pattern matching of the signal on signal line 1065 with a predetermined pattern, and outputs a predetermined multivalue signal to signal line 1066 when the two patterns coincide. When the two patterns do not coincide in the pattern matching, the signal on signal line 1065 is output to signal line 1066.

Selector 1019 selects either the signal on signal line 1065 or the signal on signal line 1066 according to an instruction from CPU 1003. The output of selector 1019 is input to LUT 1020 in the following stage via signal line 1067.

When outputting image information to printer unit 2, LUT 1020 converts the signal on signal line 1067 in accordance with the characteristics of the printer.

Selector 1021 selects either the output signal of LUT 1020 or the signal on signal line 1065 according to an instruction from CPU 1003. The output signal of selector 1021 is input to magnification circuit 1022 in the following stage via signal line 1069.

Magnification circuit 1022 can set the magnification in the x direction and in the y direction independently according to an instruction from CPU 1003. The magnification is performed by primary linear interpolation. The output of magnification circuit 1022 is input to buffer 1010 via signal line 1070.

The signal input to buffer 1010 is transmitted to printer unit 2 via two-way signal line 1057 and connector 1001 according to an instruction from CPU 1003, and a printing operation is thereby performed.

The Operation of Core Unit 10 Relating to Information of File Unit 5

A description will be provided of an example of outputting information to file unit 5.

CPU 1003 performs communication with CPU 122 of reader unit 1 via communication circuit 1002, and transmits a command to scan the original. In response to this command, reader unit 1 scans the original with scanner unit 104, and outputs image information of the original to connector 120. Reader unit 1 and external apparatus 3 are connected by a cable, and information from reader unit 1 is input to connector 1001 of core unit 10. Multivalue 8-bit image information input to connector 1001 is input to LUT 1011 via buffer 1010 and signal line 1058, and is converted into a signal of a desired density. The output signal of LUT 1011 is input to connector 1006 via selector 1013, selector 1014 and selector 1016.

That is, the signal is transmitted to file unit 5 in the form of 8-bit multivalue data without using the functions of binary-coding circuit 1012 and rotation circuit 1015. In contrast, when performing filing of a binary signal by communicating with file unit 5 via CPU bus 1054 of CPU 1003, the functions of binary-coding circuit 1012 and rotation circuit 1015 are used.

Next, a description will be provided of an example of receiving information from file unit 5.

Image information from file unit 5 is input to selector 1014 or selector 1017 via connector 1006 and signal line 1064. The signal may be input to selector 1017, and to selector 1014 or selector 1017 in the case of a multivalue 8-bit image signal and in the case of a binary image signal, respectively.

In the case of a multivalue image signal, the output signal from selector 1017 is input to LUT 1020 via selector 1019. LUT 1020 forms a look-up table in accordance with a desired print density according to an instruction of CPU 1003. The output signal from LUT 1020 is input to magnification circuit 1022 via selector 1021. The 8-bit multivalue signal magnified to a desired magnification by magnification circuit 1022 is transmitted to reader unit 1 via buffer 1010 and connector 1001.

Reader unit 1 inputs this signal to external-I/F switching circuit 119 via connector 120. External-I/F switching circuit 119 inputs the signal from file unit 5 to Y-signal generation/color detection circuit 113. The output signal from Y-signal generation/color detection circuit 113 is output to printer unit 2 after being subjected to the above-described processing, and an image is formed on output paper.

In the case of a binary image signal, the signal input to selector 1017 is input to pattern matching circuit 1018.

Pattern matching circuit 1018 functions to smooth the notched edges of the image received from file unit 5. The pattern-matched signal is input to LUT 1020 via selector 1019. In order to output the image signal received from file unit 5 to printer unit 2 as an image having a desired density, the contents of LUT 1020 can be changed by CPU 1003. Output signal 1068 of LUT 1020 is input to magnification circuit 1022 via selector 1021. Magnification circuit 1022 magnifies the 8-bit signal expressed by the two values (00H and FFH) by primary linear interpolation. The 8-bit signal from magnification circuit 1022 is transmitted to reader unit 1 via buffer 1010 and connector 1001.

Explanation of File Unit 5

Figure 5:
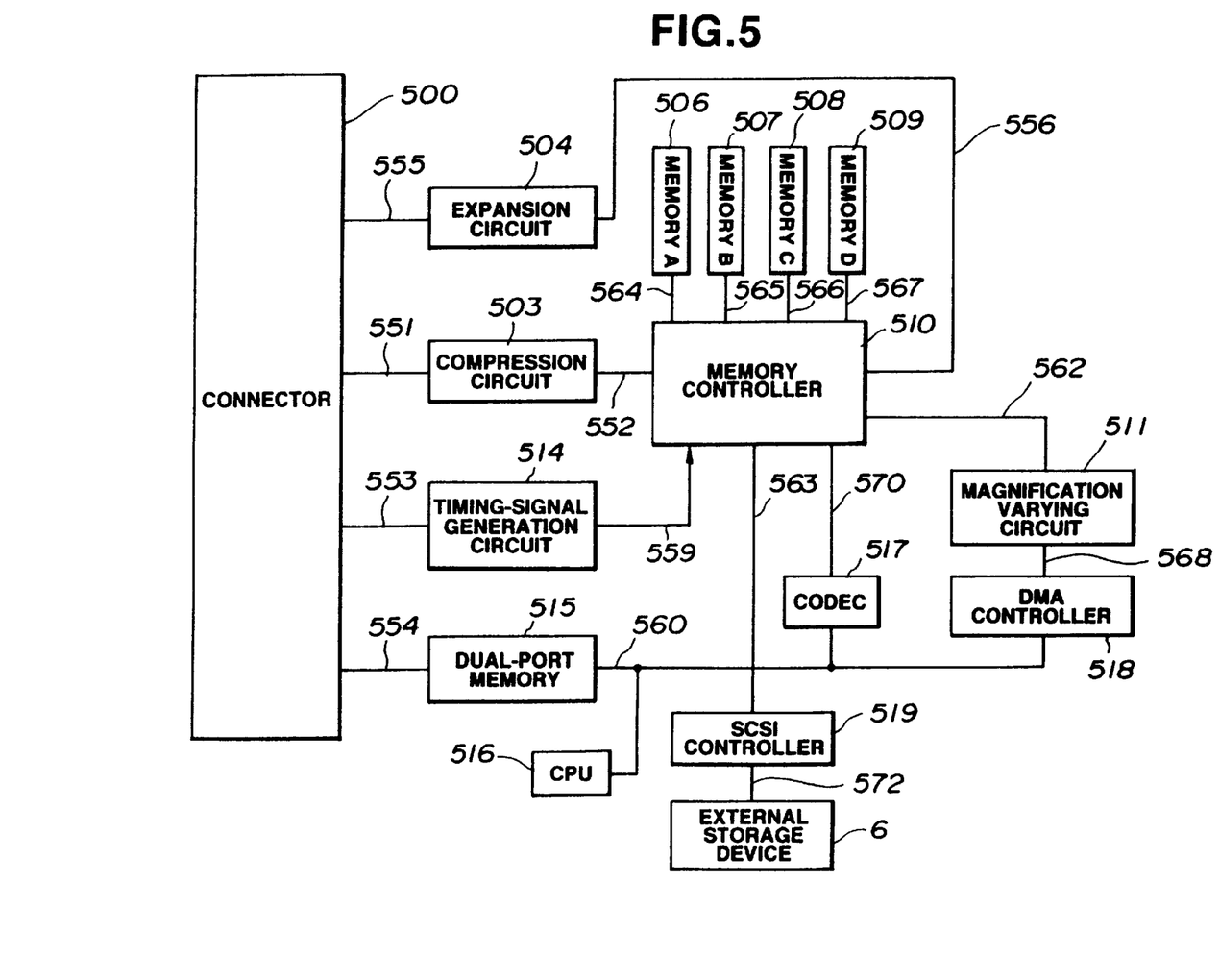
FIG. 5 is a block diagram of file unit 5.

FIG. 5 is a block diagram illustrating the detailed configuration of file unit 5. The configuration and the operation of file unit 5 will be described with reference to FIG. 5.

File unit 5 is connected to core unit 10 with connector 500 for exchanging various kinds of signals. The multivalue image signal on signal line 551 is input to compression circuit 503, in which the multivalue image information is converted into compressed information, and the converted signal is output to memory controller 510. The output signal of compression circuit 503 is stored in one of memory A 506, memory B 507, memory C 508 and memory D 509, or in a pair selected from these memories connected in cascade under the control of memory controller 510. The memory controller 510 has the following five functions: performing data exchange between memory A 506, memory B 507, memory C 508 and memory D 509, and CPU bus 560 according to an instruction from CPU 516, exchanging data with CODEC bus 570 of CODEC 517 which performs encoding and decoding, the function of performing data exchange between the contents of memory A 506, memory B 507, memory C 508 and memory D 509, and bus 562 from magnification varying circuit 511 under the control of DMA controller 518, storing the signal on signal line 563 in one of memories A 506–D 509 under the control of timing-signal generation circuit 514, and reading the memory contents from one of memories A 506–D 509 and outputting the contents read therefrom to signal line 556.

Each of memory A 506, memory B 507, memory C 508 and memory D 509 has a capacity of 2M (mega) bytes, and stores an image corresponding to A4 size paper with a resolution of 400 dpi (dots per inch). Timing-signal generation circuit 514 is connected to connector 500 with signal line 553, and is started by a control signal (HSYNC, HEN, VSYNC or VEN) from core unit 10 to generate a signal for achieving one of the following two functions: storing information from core unit 10 in one or two of memories A 506–D 509, and reading image information from one of memories A 506–D 509 and transmitting the information read therefrom to signal line 556. Dual-port memory 515 is connected to CPU 1003 of core unit 10 via signal line 554, and to CPU 516 of file unit 5 via signal line 560. Each of CPU's 1003 and 516 exchanges commands via the dual-port memory 515. SCSI controller 519 performs an interfacing operation with external storage device 6 connected to file unit 5 shown in FIG. 1. More specifically, external storage device 6 includes magnetooptical disks, and stores data, such as image information and the like. CODEC 517 reads image information stored in one of memories A 506–D 509, performs encoding according to a desired method selected from among the MH, MR and MMR methods, and stores the resultant data in one of memory A 506–memory D 509 as encoded information. After reading encoded information stored in memories A 506–D 509 and performing decoding according to a desired method selected from among the MH, MR and MMR methods, the resultant data is stored in one of memories A 506–D 509 as decoded information, i.e., image information.

Next, a description will be provided of an embodiment in which file information is stored in external storage device 6. The 8-bit multivalue image signal from reader unit 1 is input to compression circuit 503 via connector 500 and signal line 551. The signal input to compression circuit 503 is converted into compressed information. The compressed information is input to memory controller 510 via signal line 552. The memory controller 510 causes timing-signal generation circuit 514 to generate timing signal 559 in response to signal 553 from core unit 10, and stores the compressed signal on signal line 552 in memory A 506 in response to this signal. CPU 516 connects memory A 506 and memory B 507 of memory controller 510 to bus line 570 of CODEC 517. CODEC 517 reads out compressed information from memory A 506, performs encoding of the read information by the MR method, and writes the encoded information in memory B 507. After CODEC 517 has completed the encoding, CPU 516 connects memory B 507 of memory controller 510 to CPU bus 560. CPU 516 sequentially reads out encoded information from memory B 507 and transfers the read information to SCSI controller 519. SCSI controller 519 outputs the encoded information to external storage device 6 via signal line 572 to store the information.

Next, a description will be provided of an embodiment in which information is taken out from external storage device 6 and output to printer unit 2. Upon receipt of a command to retrieve and print information, CPU 516 receives encoded information from external storage device 6 via SCSI controller 519, and transfers the encoded information to memory C 508. During that time, memory controller 510 connects CPU bus 560 to bus 566 of memory C 508 by an instruction of CPU 516. After completing the transfer of the encoded information to memory C 508, CPU 516 connects memory C 508 and memory D 509 to bus 570 of CODEC 517 by controlling memory controller 510. CODEC 517 reads the encoded information from memory C 508, sequentially decodes the read information, and transfers the decoded data to memory D 509. When magnification varying processing, such as magnification, reduction or the like, is necessary when outputting the data to printer unit 2, the information in memory D 509 is output to magnification varying circuit 511, where the image data is subjected to magnification varying processing under the control of DMA controller 518. CPU 516 performs communication with CPU 1003 of core unit 10 via dual-port memory 515, and performs setting for outputting the image data from memory D 509 to printer unit 2 via core unit 10 to print the corresponding image. After the completion of the setting, CPU 516 triggers timing-signal generation circuit 514, causing it to output a predetermined timing signal to memory controller 510 via signal line 559. In synchronization with the signal from timing-signal generation circuit 514, memory controller 510 reads out decoded information from memory D 509 and outputs the read information to expansion circuit 504 via signal line 556 to expand the information. The output signal of expansion circuit 504 is transmitted to core unit 10 via signal line 555 and connector 500. Since the process for outputting the data from connector 500 to printer unit 2 has been described in the explanation of core unit 10, a description thereof will be omitted.

Next, a description will be provided of the processing for newly registering index information and storing a document image using a mark sheet, which is a principal portion of the present embodiment.

Figure 6:
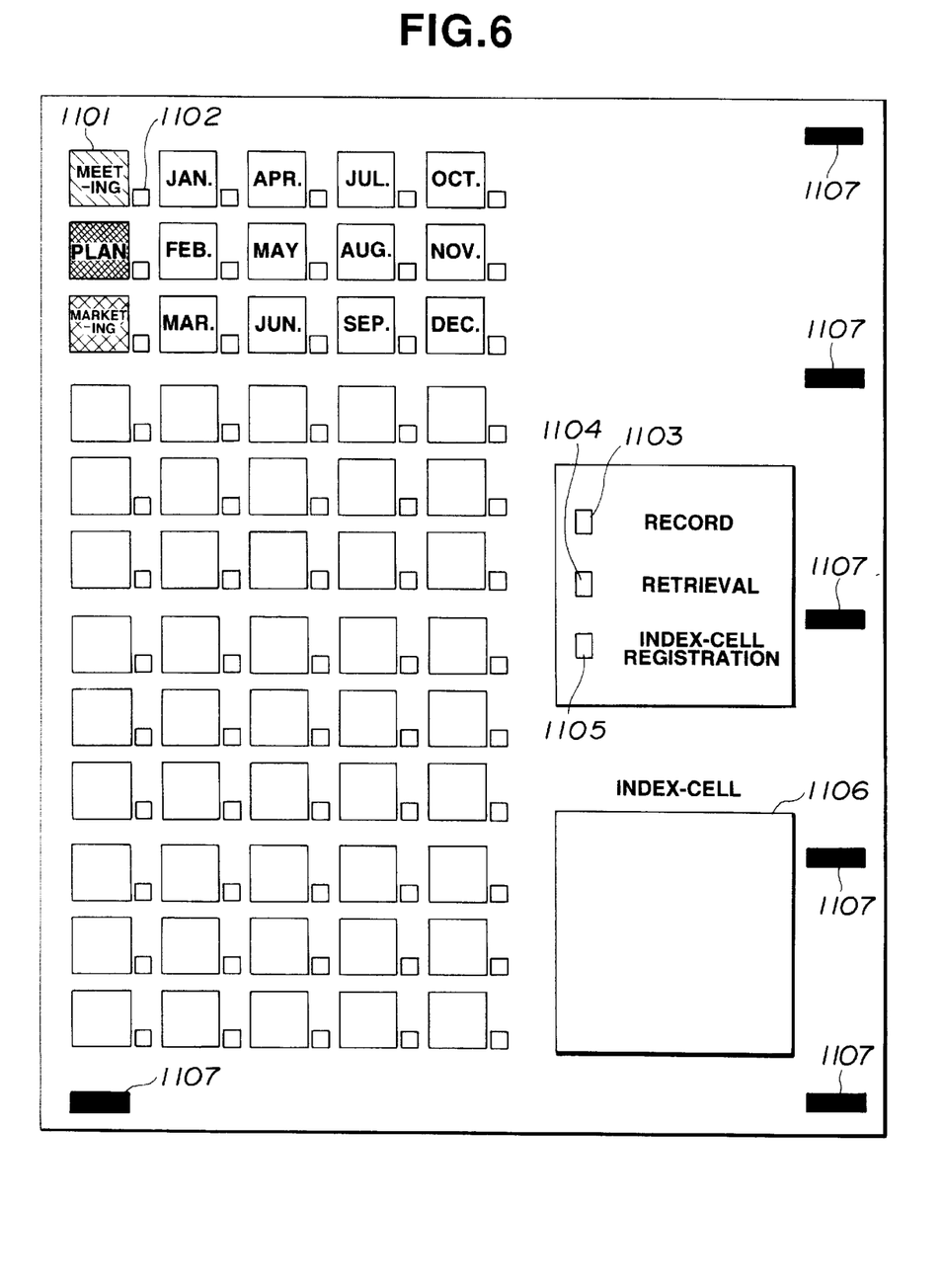
FIG. 6 is a diagram illustrating a print output of a mark sheet.

FIG. 6 illustrates a print output of a mark sheet.

In FIG. 6, reference numeral 1101 represents information relating to each index, stored in a storage medium loaded in external storage device 6 of file unit 5, for identifying an image. Each index information 1101 comprises an index cell which functions like a key word for classifying document-image information stored in a storage medium. Reference numeral 1102 represents a check column for selecting the corresponding index cell 1101. The operator selects a desired index cell by painting out or marking the corresponding check column using a pencil or the like.

Reference numeral 1103 represents a check column for selecting a mode of storing an image, reference numeral 1104 represents a check column for selecting a mode of retrieving an image, reference numeral 1105 represents a check column for selecting a mode of newly registering an index cell, reference numeral 1106 represents a region for drawing the image of an index cell to be registered, and reference numeral 1107 represents marks indicating a mark sheet. These marks also are used for detecting and correcting misalignment of the mark sheet.

Figure 7:
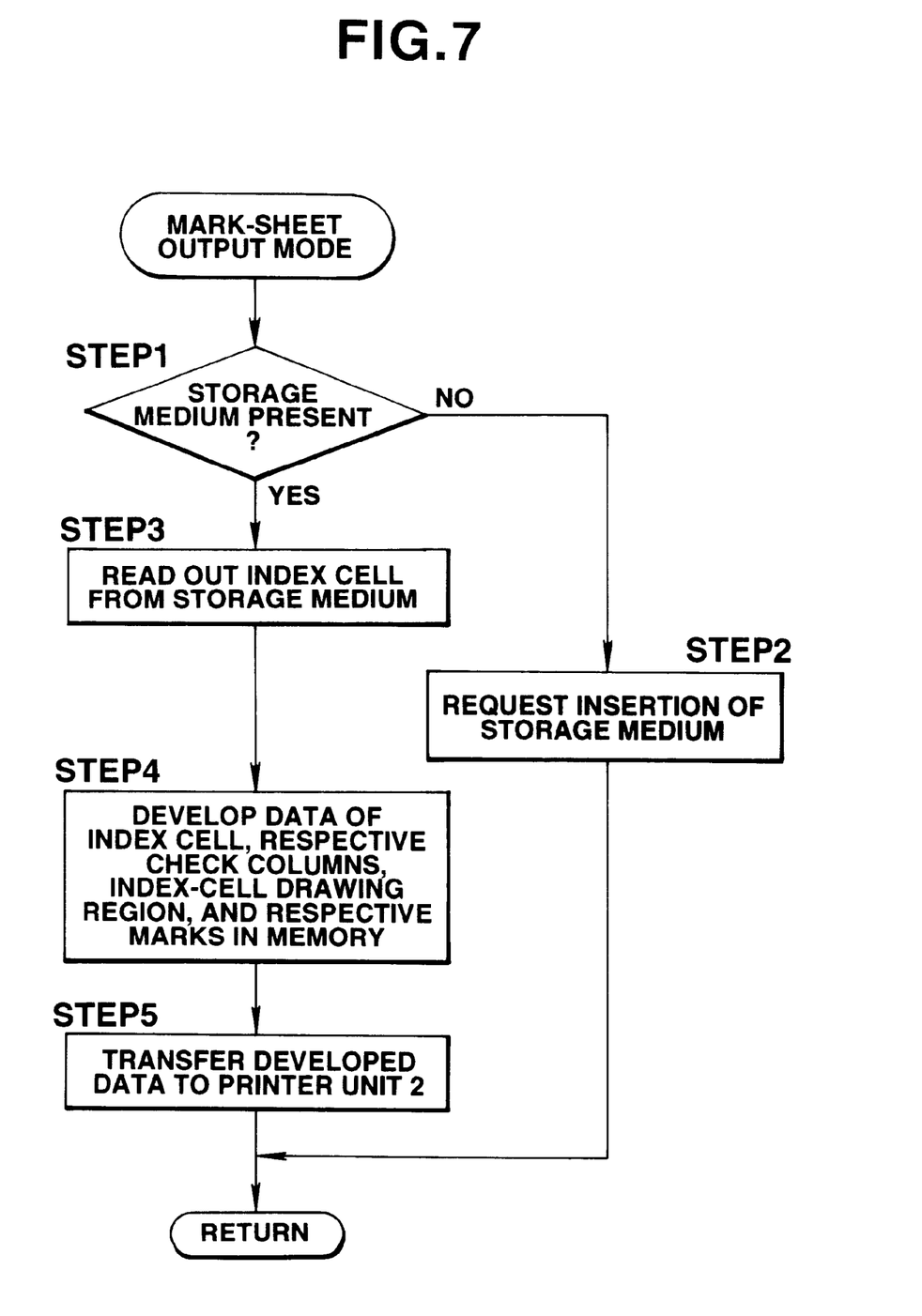
FIG. 7 is a flowchart illustrating the operation of a mark-sheet output mode.

Next, preparation of a mark sheet will be described with reference to FIG. 7. When preparing a mark sheet, a mark-sheet output mode is set through operation unit 124 of reader unit 1. A sensor within external storage device 6 detects whether or not a storage medium is loaded in external storage device 6 (step 1). If the result of the detection is negative, a request to load a storage medium is displayed on a display unit of operation unit 124 of reader unit 21 (step 2). If the result of the detection in step 1 is affirmative, index-cell information stored in a predetermined address of the storage medium is read (step 3). Format data of a mark sheet having check columns 1102 for selecting a desired index cell, check columns 1103, 1104 and 1105 for selecting the execution of recording, retrieval, and the registration of an index cell, respectively, region 1106 for drawing the image of an index cell to be registered, and marks 1107 for discriminating the mark sheet is read from a ROM (read-only memory, not shown) by an instruction of CPU 516, and is developed in one of memories A 506–D 509 in the form of a bit map. The read index-cell information is synthesized at the position of index cells in the data of the mark sheet developed in the memory (step 4), and the resultant data is tranferred to printer unit 2 in the above-described manner. Thus, the mark sheet is output from printer unit 2. The index-cell information is recorded on the index cell at each predetermined position.

Figure 8:
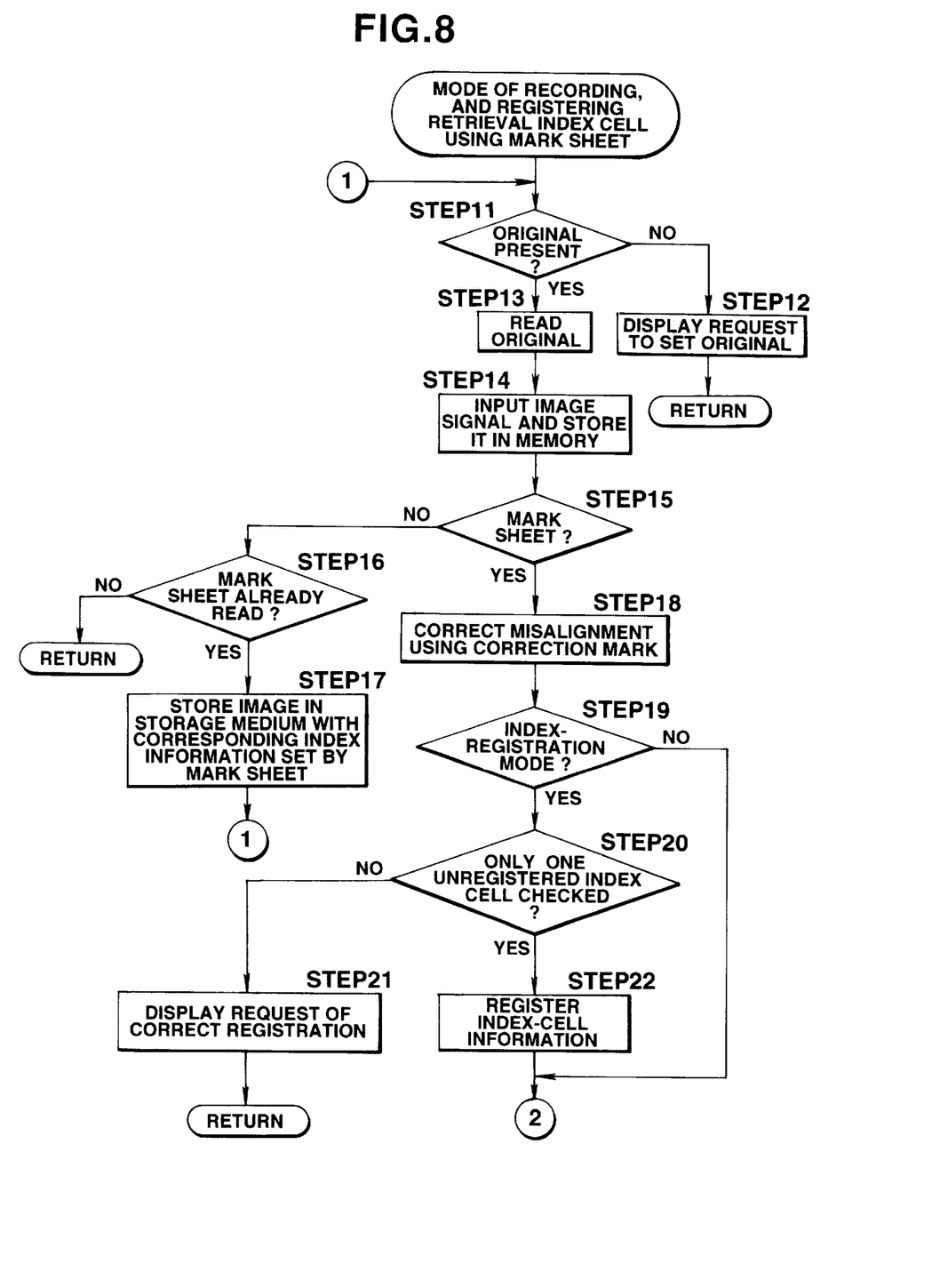
FIGS. 8 and 9 are flowcharts which illustrate the steps carried out when the registration of an index cell and the recording and retrieval of a document image are performed using a mark sheet.
Figure 9:
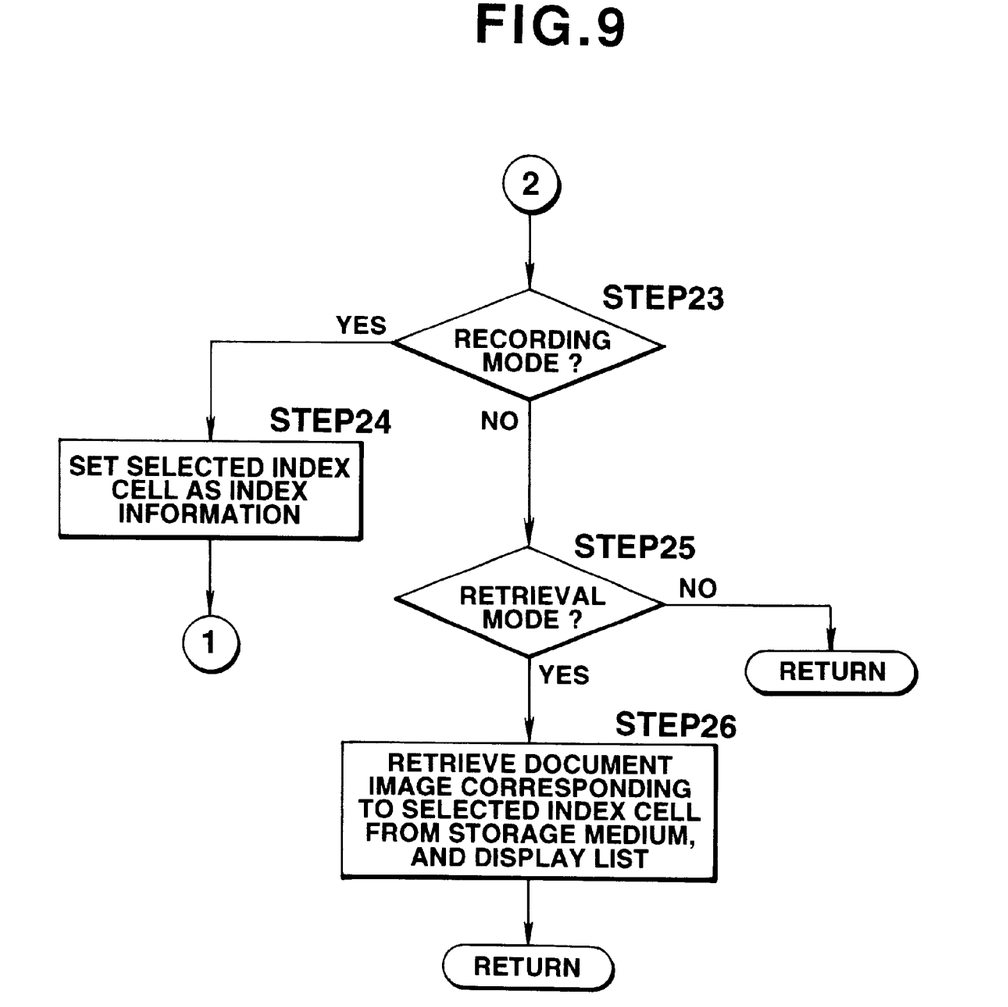

Next, a description will be provided of the processing which occurs when registering an index cell using a mark sheet, when simultaneously storing a document image in a storage medium utilizing the index cell, and when retrieving a document image, with reference to FIGS. 8 and 9.

When registering a new index cell in a storage medium, a check mark is entered in check column 1105 for selecting a mode of registering an index cell by the user, the image of the index cell is entered in drawing region 1106 for an index cell by the user, a check mark is entered in the check column corresponding to the desired unregistered index cell by the user, and the provided mark sheet is read by reader unit 1.

When simultaneously storing a document image in a storage medium using that index cell, a check mark is entered in check column 1103 for recording on the mark sheet by the user, a check mark is entered in the check column corresponding to the desired registered index cell whenever necessary by the user, and the document to be recorded is read together with the mark sheet by reader unit 1.

When retrieving a document image, a check mark is entered in check column 1104 for retrieval on the mark sheet by the user, a check mark is entered in the check column corresponding to the desired registered index cell by the user, and a document to be recorded is read together with the mark sheet by reader unit 1.

First, a sensor provided in the original-mounting portion of feeding unit 101 detects whether or not originals are mounted on feeding unit 101 (step 11). If the result of the detection is negative, a request to set originals is displayed on a display unit (not shown) of operation unit 124 (step 12). If the result of the detection in step 11 is affirmative, each original is fed onto the platen, where the image of the original is read (step 13).

Information of the image of the original read by reader unit 1 is transmitted to file unit 5, and is stored in one of memories A 506–D 509 (step 14). CPU 516 determines whether or not the image information stored in one of memories A 506–D 509 is the image of the mark sheet according to the presence/absence of marks 1107 for discriminating the mark sheet (step 15).

If the result of the detection is negative, it is judged whether or not the mark sheet has already been read according to a flag in a RAM (random access memory, not shown) or the like (step 16). If the result of the judgement in step 16 is affirmative, the read image is stored in the storage medium together with the corresponding index information set by the mark sheet (step 17).

If the image read by reader unit 1 is the mark sheet, a flag is set in the RAM. In some cases, due to deviation (deviation in the vertical or horizontal direction, or rotation) of the mounted position of the mark sheet on the platen of reader unit 1, expansion/contraction of the mark sheet, or the like, misalignment occurs between the image of the read mark sheet and the format stored in one of memories A 506–D 509. Such misalignment is corrected by comparing the image of the mark sheet with the format using marks 1107 for correcting misalignment, and an image in the check column within the memory is read (step 18).

Next, it is judged whether or not check column 1105 for registering an index cell on the mark sheet has been checked (step 19). If the result of the judgement is affirmative, it is then judged whether or not only one unregistered index cell has been checked from among index cells 1102 (step 20).

When no unregistered index cell has been checked or at least two unregistered index cells have been checked, a display to request correct registration is performed (step 21).

When only one unregistered index cell has been checked, the image drawn in region 1106 for drawing an index cell is registered in the storage medium loaded in external storage device 6 as index-cell information corresponding to the position of the checked index cell (step 22). Instead of drawing the image of an index cell in region 1106, the image of the index cell may be read using a sheet for new registration.

When it has been judged that check column 1105 for registering an index cell has not been checked in step 19, or after the completion of index registration, it is judged whether or not check column 1103 for recording on the mark sheet has been checked (step 23). If the result of the judgement is affirmative, the selected index cell and the newly registered index cell are set as index information (step 24). The image of the subsequently read original is stored in external storage device 6 with making the selected index cell and the newly registered index cell index information.

If the result of the judgement in step 23 is negative, it is then judged whether or not check column 1104 for retrieval on the mark sheet has been checked (step 25). If the result of the judgement is affirmative, the document image corresponding to the selected index cell is retrieved from the storage medium, and a list is displayed (step 26). The list may be displayed on the display unit of operation unit 124, or by connecting a display unit, such as a CRT, a liquid-crystal display or the like, to the file unit.

If the desired document is assigned from the displayed list, the image data of the assigned document is read from the storage medium, and the image of the document is displayed on the CRT, or printed by printer unit 2.

The individual components shown in outline or designated by blocks in the drawings are all well-known in the image filing apparatus arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image filing apparatus for designating index information to be set for a document image by using a mark sheet and for storing the document image in a storage medium, the mark sheet having an index area on which a plurality of index images representing index information are printed in a predetermined disposition, a designation area in which an operator can enter a designation in order to designate a position of a desired index image and a drawing area in which the operator can draw an index image to be newly added to the index area, said apparatus comprising:

reading means for reading sheets including at least one document sheet and the mark sheet;

index image registration means for registering an image drawn in the drawing area on the mark sheet read by said reading means as an index image corresponding to a position of a designation entered in the designation area on the mark sheet; and storage control means for setting the index image registered by said index image registration means as index information for an image of a document sheet read subsequent to the mark sheet by said reading means and for storing the image of the document sheet in said storage medium.

2. An image filing apparatus according to claim 1, wherein the mark sheet further has a storage-mode check are defining an area in which are operator can enter a check for setting said apparatus in a storage mode during which the image of the document sheet is stored in said storage medium, and wherein said storage control means operates when the storage-mode check area contains an entered check.

3. An image filing apparatus for designating index information to be set for a document image by using a mark sheet and for storing the document image in a storage medium, the mark sheet having an index area on which a plurality of index images representing index information are printed in a predetermined disposition and a designation area in which an operator can enter a designation in order to designate a position of a desired index image, said apparatus comprising:

reading means for reading sheets and outputting respective image signals;

judging means for judging whether or not each read sheet is a mark sheet based on the respective image signal output by said reading means;

index image registration means for, when said judging means judges that a current sheet read by said reading means is a mark sheet, registering a new image as an index image corresponding to a position of a designation entered in the designation area on the mark sheet; and storage control means for setting, when a subsequent read sheet, read after the mark sheet, is not a mark sheet, the index image registered by said index image registration means as index information for the subsequent sheet and for storing an image of the subsequent sheet in said storage medium.

4. An image filing apparatus according to claim 3, wherein said index image registration means registers an image drawn on a predetermined area of the mark sheet as the index image.

5. An image filing apparatus according to claim 3, wherein said index image registration means registers an image on a sheet, which sheet is different from the mark sheet, as the index image.

6. An image filing apparatus for designating index information to be set for a document image by using a mark sheet and for storing the document image in a storage medium, said apparatus comprising:

first read-out means for reading out a first plurality of index images from said storage medium, said storage medium storing a second plurality of index images including the first plurality of index images respectively representing index information for retrieving a desired image;

second read-out means for reading out format data from a memory, the format data including first data representing a first check column for instructing registration of a new index image, second data representing a second check column for instructing storage of a document image, third data representing an area for drawing the new index image, and fourth data representing a third check column for designating a position on the mark sheet where the new index image is to be disposed, wherein instructing registration of the new index image based on the first data and instructing storage of the document image based on the second data are performable concurrently; and mark sheet outputting means for causing a printer to output a mark sheet by composing the first plurality of index images read out by said first read-out means and the format data read out by said second read-out means, wherein the first plurality of index images are disposed on the output mark sheet in the position designated by the third check column.

7. An image filing method in an image filing apparatus for designating index information to be set for a document image by using a mark sheet and for storing the document image in a storage medium, the mark sheet having an index area on which a plurality of index images representing index information are printed in a predetermined disposition, a designation area in which an operator can enter a designation in order to designate a position of a desired index image and a drawing area in which the operator can draw an index image to be newly added to the index area, said method comprising the steps of:

reading sheets including at least one document sheet and the mark sheet;

registering an image drawn in the drawing area on the mark sheet read in said reading step as an index image corresponding to a position of a designation entered in the designation area on the mark sheet; and setting the index image registered in said registration step as index information for a document sheet read in said reading step and storing the image of the document sheet in the storage medium.

8. An image filing method in an image filing apparatus for designating index information to be set for a document image by using a mark sheet and for storing the document image in a storage medium, the mark sheet having an index area on which a plurality of index images representing index information are printed in a predetermined disposition and a designation area in which an operator can enter a designation in order to designate a position of a desired index image, said method comprising the steps of:

reading sheets and outputting respective image signals;

judging whether or not each read sheet is a mark sheet based on the respective image signal output in said reading step;

when said judging step judges that a current sheet read in said reading step is a mark sheet, registering a new image as an index image corresponding to a position of a designation entered in the designation area on the mark sheet; and setting, when a subsequent read sheet, read after the mark sheet, is not a mark sheet, the index image registered in said registration step as index information for the subsequent read sheet and for storing the image of the subsequent read sheet in the storage medium.

9. An image filing method in an image filing apparatus for designating index information to be set for a document image by using a mark sheet and for storing the document image in a storage medium, comprising:

a first read-out step of reading out a first plurality of index images from the storage medium, the storage medium storing a second plurality of index images including the first plurality of index images respectively representing index information for retrieving a desired image;

a second read-out step of reading out format data from a memory, the format data including first data representing a first check column for instructing registration of a new index image, second data representing a second check column for instructing storage of a document image, third data representing an area for drawing the new index image, and fourth data representing a third check column for designating a position on the mark sheet where the new index image is to be disposed, wherein instructing registration of the new index image based on the first data and instructing storage of the document image based on the second data are performable concurrently; and an output step of causing a printer to output a mark sheet by composing the first plurality of index images predetermined disposition and a designation area in which an operator can enter a designation in order to designate a position of a desired index image; and the format data read out at said second read-out step, wherein the first plurality of index images are disposed on the output mark sheet in the position designated by the third check column.

\* \* \* \* \*

UNITED STATES PATENT AND TRADEMARK OFFICE
CERTIFICATE OF CORRECTION

PATENT NO.  : 5,982,955

DATED       : November 9, 1999

INVENTOR(S) : HIROYUKI YAGUCHI ET AL.          Page 1 of 2

It is certified that error appears in the above-identified patent and that said Letters Patent is hereby corrected as shown below:

Title page, item
[73] ASSIGNEE

"Canon Kabushiki Kaisha, Japan" should read
--Canon Kabushiki Kaisha, Tokyo, Japan--.

COLUMN 3

Line 12, "recordingpaper" should read
--recording paper--.

COLUMN 12

Line 32, "are" should read --area--.
Line 33, "are" should read --an--.

UNITED STATES PATENT AND TRADEMARK OFFICE
CERTIFICATE OF CORRECTION

PATENT NO. : 5,982,955

DATED : November 9, 1999

INVENTOR(S) : HIROYUKI YAGUCHI ET AL.

It is certified that error appears in the above-identified patent and that said Letters Patent is hereby corrected as shown below:

<u>COLUMN 14</u>

Line 49-52, "predetermined disposition and a designation area in which an operator can enter a designation in order to designate a position of a desired index image;" should be deleted.

Signed and Sealed this

Fifth Day of December, 2000

Attest:

Q. TODD DICKINSON

*Attesting Officer*  *Director of Patents and Trademarks*